United States Patent [19]
Nakamura

[11] Patent Number: 5,377,358
[45] Date of Patent: Dec. 27, 1994

[54] CHARACTER PROCESSING DEVICE ADAPTED TO PERFORM DOCUMENT-EDITING PROCESSING AND TYPEWRITING PROCESSING

[75] Inventor: Kazuhiro Nakamura, Tanashi, Japan

[73] Assignee: Canon Kabushiki Kaisha, Tokyo, Japan

[21] Appl. No.: 978,157

[22] Filed: Nov. 17, 1992

Related U.S. Application Data

[63] Continuation of Ser. No. 299,426, Jan. 23, 1989, abandoned.

[30] Foreign Application Priority Data

Jan. 30, 1988 [JP] Japan .................. 63-20800

[51] Int. Cl.5 ............... G06F 9/06; G06F 13/10
[52] U.S. Cl. ............... 395/800; 364/234;
364/234.4; 364/236; 364/231.31; 364/238.4;
364/245.6; 364/246; 364/280.7; 364/280.2;
364/DIG. 1; 364/DIG. 2; 395/145; 395/146;
395/148
[58] Field of Search ............ 395/425, 800, 500, 325,
395/375, 115, 112, 200, 775, 725, 275, 250, 148,
146; 400/76, 61, 70, 63, 83, 487; 364/419, DIG.
1, DIG. 2

[56] References Cited

U.S. PATENT DOCUMENTS

| | | | |
|---|---|---|---|
| 4,589,785 | 5/1986 | Sato | 400/61 |
| 4,742,485 | 5/1988 | Carlson et al. | 364/419 |
| 4,812,999 | 3/1989 | Ohara | 400/61 |
| 4,845,752 | 7/1989 | Blanc et al. | 364/131 |
| 4,898,483 | 2/1990 | Iizuka | 400/61 |
| 4,912,669 | 3/1990 | Iwamoto et al. | 364/900 |
| 4,926,373 | 5/1990 | Takenaka | 395/112 |
| 4,949,287 | 8/1990 | Yamaguchi et al. | 400/61 |
| 4,949,300 | 8/1990 | Christenson et al. | 364/900 |
| 4,957,377 | 9/1990 | Takashashi | 400/61 |
| 5,033,879 | 7/1991 | Abe et al. | 400/61 |

Primary Examiner—Alyssa H. Bowler
Assistant Examiner—Daniel Pan
Attorney, Agent, or Firm—Fitzpatrick, Cella, Harper & Scinto

[57] ABSTRACT

A character processing device adapted to perform document-editing processing and typewriter processing of information. The device includes a switch for switching the device between document-editing processing and typewriter processing. Also provided are first, second, and third memories. The first memory stores common information used for conducting document-editing processing and typewriting processing. The second memory stores information for use in conducting document-editing processing, while the third memory stores information for use in conducting typewriting processing. Also provided is a central processing unit for causing information in the first memory to be loaded into the second memory when the switch switches the device into performing document-editing processing. The central processing unit also causes the common information in the first memory to be loaded into the third memory when the switch switches the device into performing typewriting processing. The central processing unit further causes information in the second memory to be copied into the first memory when the switch switches the device from document-editing processing to typewriter processing, and causes information in the third memory not to be copied into the first memory when the switch switches the device from performing typewriting processing to document-editing processing.

14 Claims, 8 Drawing Sheets

CHARACTER PROCESSING DEVICE ADAPTED TO PERFORM DOCUMENT-EDITING PROCESSING AND TYPEWRITING PROCESSING

This application is a continuation-in-part of application Ser. No. 07/299,426 filed Jan. 23, 1989, now abandoned

BACKGROUND OF THE INVENTION

1. Field of the Invention

This invention relates to a character processing device provided with plural functions, such as the function of preparing and editing of documents or the like, or the functions of a typewriter.

2. Description of the Related Art

Heretofore, in this kind of device (for example, the one described in U.S. Pat. No. 4,926,373), initial information, such as the format information or the like used in the performance of one function, is stored and used separately, in most cases, from initial information used in the performance of another function. Moreover, even when the initial information is stored and used, in common, in the performing of different functions, the information is fixed, and information that is modified during the performing of one of the functions is never used in the performing of other functions.

However, some of the functions performed by a character processing device are similar, such as document-editing processing and typewriting processing. As a result, the format information, such as the amount of blank space between lines, the margin position, the tab position or the like, is usually the same when the device performs these functions.

In a conventional device, however, it is necessary to set such format information at a respective desired value after the activation of each function, even though only the same value is required. This is a cumbersome and inconvenient operation for the operator.

SUMMARY OF THE INVENTION

It is an object of the present invention to solve the problems of the prior art.

It is another object of the present invention to provide an information and character processing device of improved operability and improved ease of use.

It is still another object of the present invention to provide a character processing device which performs a plurality functions, some of which are performed on the basis of information in common to the plurality of functions, and others of which are performed on the basis of information not used by the other functions.

It is another object of the present invention to provide an information processing device which automatically uses desired initial information when performing a variety of functions, without an operator being required to set the initial information before the device performs each of its different functions.

In one aspect, an embodiment of the present invention which accomplishes these goals relates to a character processing device adapted to perform document-editing processing and typewriting processing of information. The device comprises a switch for switching the device between performing document-editing processing and typewriting processing. The device further comprises first, second, and third storing area of a memory, and controller. The first storing area stores common information used for conducting document-editing processing and typewriting processing. The second storing area stores information for use in conducting document-editing processing. The third storing area stores information for use in conducting typewriting processing. The controller is arranged to cause the common information in the first storing area to be loaded into the second storing area and causes the device to perform document-editing processing using information in the second storing area when the switch switches the device to perform document-editing processing. The controller is also arranged to cause the common information in the first storing area to be loaded into the third storing area and causes the device to perform typewriting processing using the information in the third storing area when the switch switches the device to perforce typewriting processing. The controller is further arranged to cause the information in at least one of the second and third storing area to be copied into the first storing area for use in conducting document-editing processing and typewriting processing in response to the switch switching the device from performing one of document-editing processing and typewriting processing to the other of document-editing processing and typewriting processing.

The controller is also arranged to cause the information in the second storing area to be copied into the first storing area in response to the switch switching the device from document-editing processing to typewriting processing. The information in the second storing area can comprise format information. Also provided is a modifier for modifying the format information in the second storing area during document-editing processing. In this embodiment the controller causes the modified format information to be copied into the first storing area for use in conducting typewriting processing in response to the switch switching the device from the document-editing processing to typewriting processing.

In another aspect, the character processing device in addition to including switch, and first, second, and third storing area, includes controller for causing the information in the second storing area to be copied into the first storing area when the switch switches the device from the document-editing processing to typewriting processing, and for causing information in the third storing area not to be copied into the first storing area when the switch switches the device from typewriting processing to document-editing processing.

In this embodiment the controller also causes common information in the first storing area to be loaded into the second storing area when the switch switches the device to perform document-editing processing, and causes the common information in the first storing area to be loaded into the third storing area when the switch switches the device to perform typewriting processing.

In still another aspect of the present invention, each type of processing performed by the device can be categorized as a if main function or subfunction of the device. As a result, the information used to perform each type of processing is controlled in accordance with the categorization of its associated processing. When the processing is classified as a main function, information used for that processing which is modified will be stored in a common memory and then used for performing the processing classified as a subfunction. On the other hand, when information is modified and used for processing which is classified as a subfunction, this modified information is not stored in the common memory and cannot be used during processing classified as main functions. As a result, it is possible to obtain information used for different types of processing, as well as information which is used only for one type of processing.

The above and other objects, features, and advantages of the present invention will become clear from the following description of the preferred embodiments taken in conjunction with the accompanying drawings.

BRIEF DESCRIPTION OF THE DRAWINGS

FIG. 5 (B) is a flow chart showing a key input processing;

FIG. 5 (C) is a flow chart of the first function, i.e., the document processing; and FIG. 5 (D) is a flow chart of the second function, i.e., the typewriting processing.

DESCRIPTION OF THE PREFERRED EMBODIMENT

An embodiment of the present invention will be hereinafter explained in detail with reference to the drawings.

Figure 1:
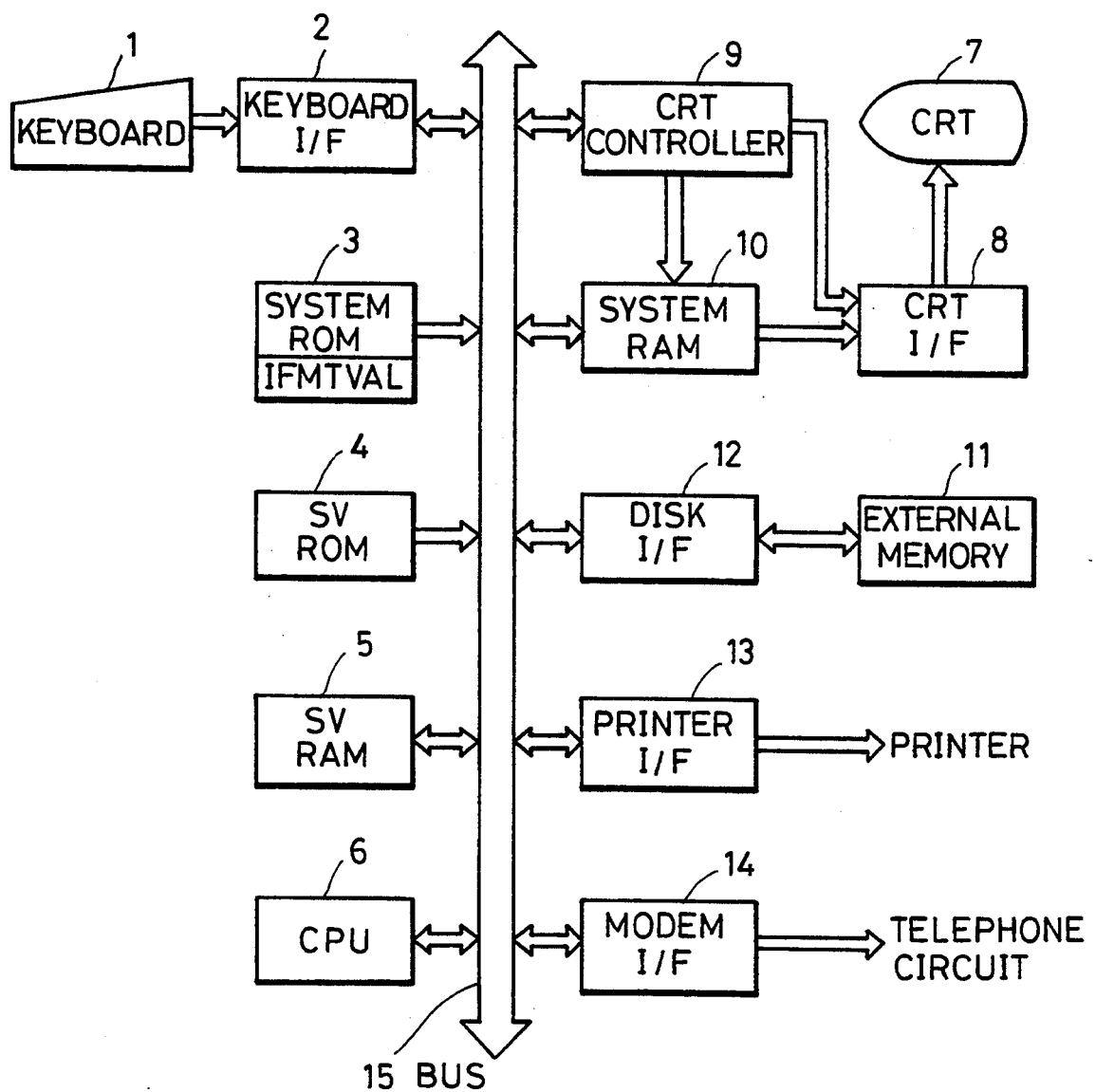
FIG. 1 is a block diagram of a character processing device according to the present invention.
Figure 2:
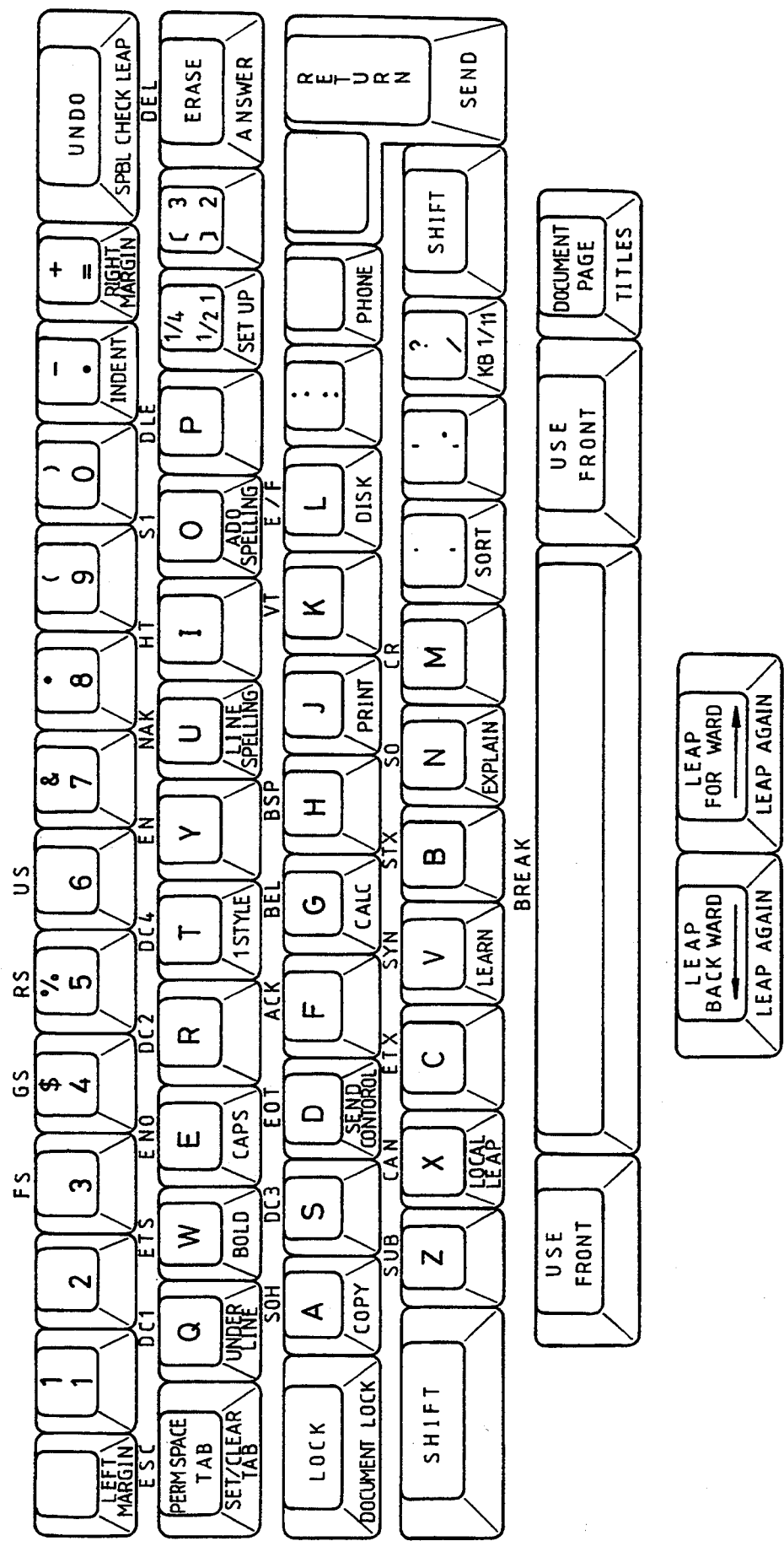
FIG. 2 is a top plan view showing the detail of the keyboard shown in FIG. 1.

In FIG. 1, a keyboard 1 includes, as shown in FIG. 2, keys for inputting information such as alphabetical characters, numerals, symbols and functions for the device to perform. Examples of function keys include USE FRONT, LEAP, UNDO, SORT, LEARN, keys for modifying the format of input data, a document processing selection key for selecting document-editing processing, and a typewriting processing selection key for selecting typewriting processing, or the like. The information generated by operating a key on the keyboard 1 is sent to a bus 15 via a keyboard interface 2.

A system ROM 3 (Read Only Memory) stores control procedures directing the control of the entire device, such as control procedures to be illustrated later in FIG. 5, and the initial format information. An SVROM 4 (Service Read Only Memory) stores a word dictionary used for checking spelling. An SVRAM 5 (Service Random Access Memory) stores words whose spelling is checked.

A CPU 6 controls the operations of the elements of the device and executes processes according to the control procedures stored in the system ROM 3 and the information stored in a system RAM 10. For example, CPU 6 switches the device between performing document-editing processing and typewriting processing in response to the operation of the document processing selection key and the typewriting processing selection key. The bus 15 transmits signals of addresses, data, controls and the like to the entire system.

A CRT 7 is of the device a display unit which displays the information stored in memories by a CRT controller 9 via a CRT interface 8.

Figure 3:
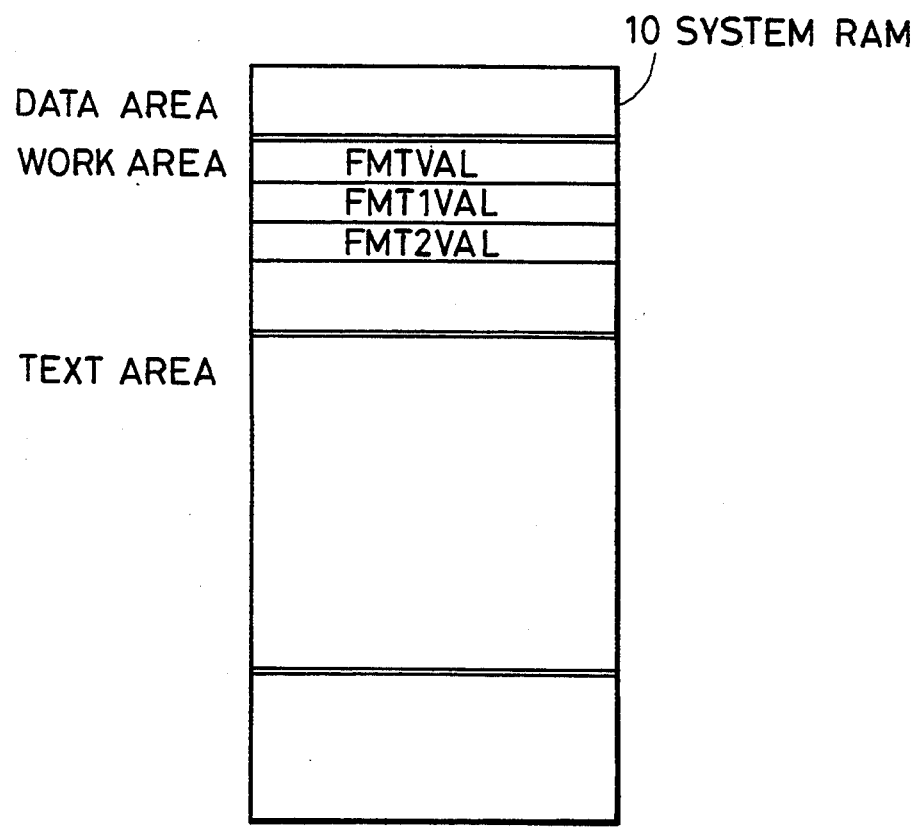
FIG. 3 is a block diagram of the system RAM shown in FIG. 1.

The system RAM 10 includes, as shown in FIG. 3, a CRT data area for storing data for display, a work area which is an operation area for information, and a text area for storing documents to be prepared and edited, or the like. The work area includes an area for storing information on each of the operations of the present embodiment. Common information used for conducting document-editing processing and typewriting processing is stored in an FMTVAL (initial information common save area 10a). Also provided in the workarea is an area FMT1VAL (document-editing processing initial information save area 10b) in which the initial information for use in conducting document-editing processing as the first function is stored, and an area FMT2VAL (typewriting processing initial information save area 10c) in which the initial information for use in conducting typewriting processing as the second function is similarly stored.

An external memory 11 in the form of floppy disks stores the input information. The information is accessed via a disk interface 12. The information to be printed out is sent to a printer via a printer interface 13.

A modem interface 14 is provided for transmitting and receiving information using a telephone circuit.

Figure 4:
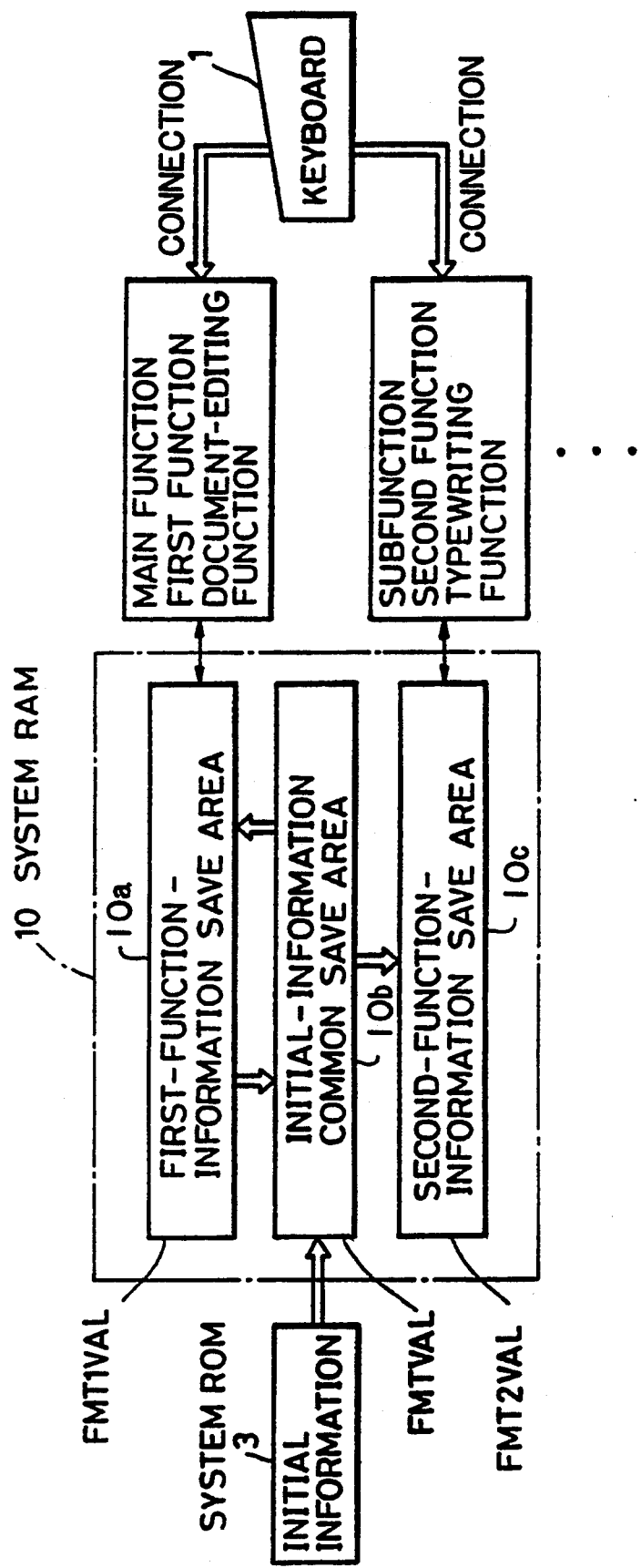
FIG. 4 is a block diagram showing an outline of the operation of the present embodiment.

Processing of information in the embodiment consisting of the above-described configuration will be hereinafter explained with reference to FIG. 4.

In the present embodiment, when power from a power supply is applied, the initial format information held in the IFMTVAL of the system ROM 3 is loaded into the initial-information common save area FMTVAL of the system RAM 10 under control of CPU 6. Next, the document-editing processing as the first function is activated by CPU 6 by the operator operating the document processing selection key to switch the device to perform document-editing processing. As the initial processing, the initial format information in the initial-information common save area FMTVAL is loaded into the first-function-information save area FMT1VAL under control of CPU 6. The loaded information is used as the initial information of the format information when the device performs its document-editing function. It is possible to modify the format information during the performing of the document-editing function, by depressing the appropriate keys on keyboard 1 which causes CPU 6 to update the information in the first-function-information save area FMT1VAL every time the format information is modified.

When the operator next selects typewriting processing as the second function after document-editing, by the operation of the key for selecting the typewriting processing function on the keyboard 1, the information in the first-function-information save area FMT1VAL is copied to the initial-information common save area FMTVAL under CPU 6 control, and typewriting processing as the second function is activated by CPU 6 while the first function is interrupted. At this time, as the initial processing, the information in the initial-information common save area FMTVAL is loaded into the second-function-information save area FMT2VAL under control by CPU 6. This information is used as the initial value of the format information when the device performs its typewriting function. It is possible for CPU 6 to cause the format information to be modified during the typewriting processing by depressing appropriate keys on keyboard 1, but the modified format information is effective only during the performing of the typewriting function, and CPU 6 does not permit such modified format information to influence the information in the initial-information common save area FMTVAL or to be copied into the FMTVAL.

Next, the above-described processing will be explained in more detail using the flow charts shown in FIGS. 5 (A) through 5 (D).

Figure 5A:
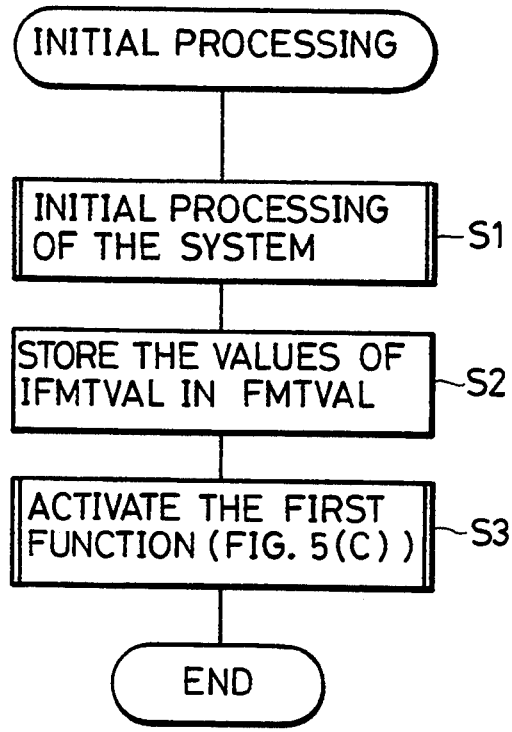
FIG. 5 (A) is a flow chart showing an initialization processing of the system.
Figure 5B:
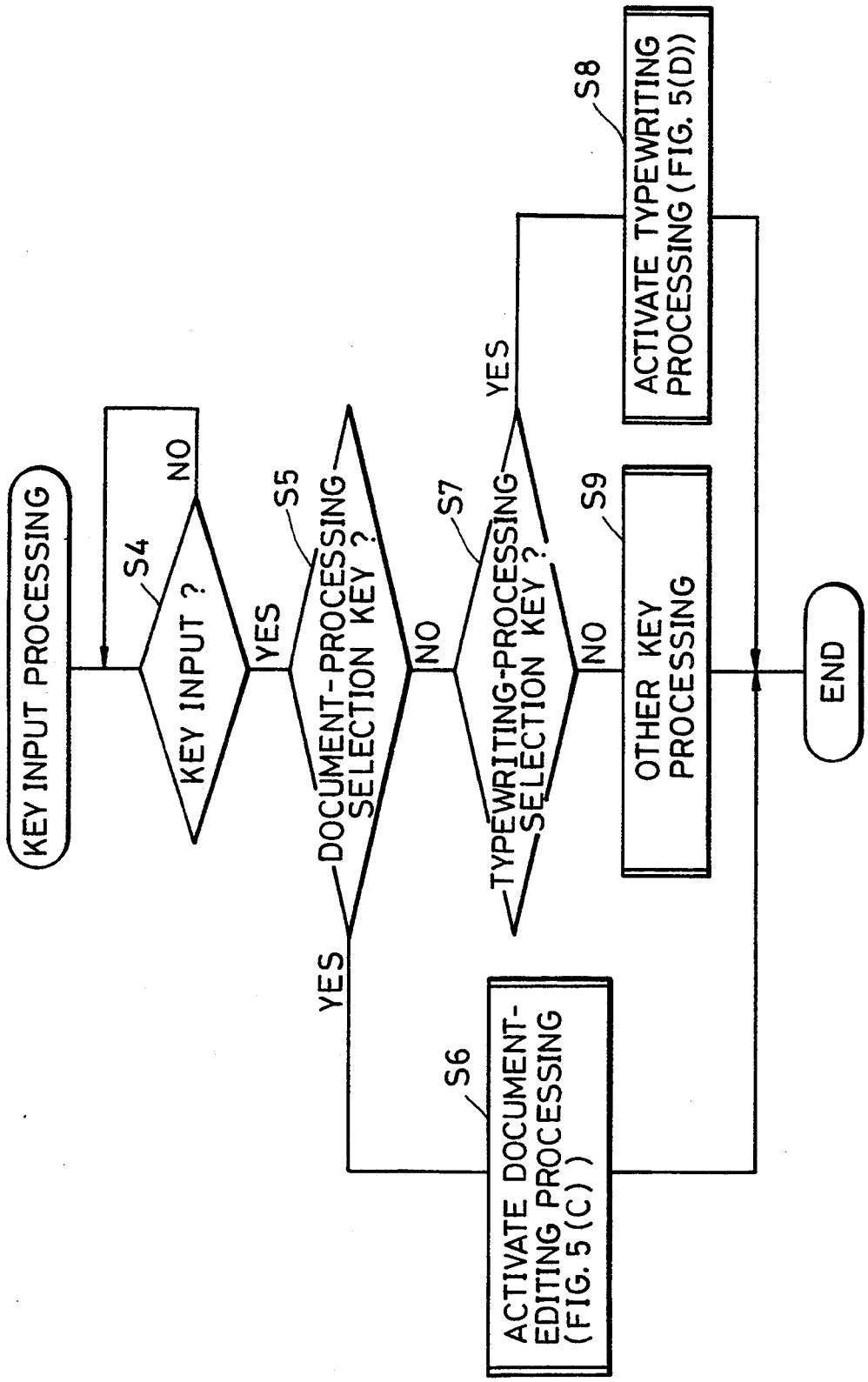
Figure 5C:
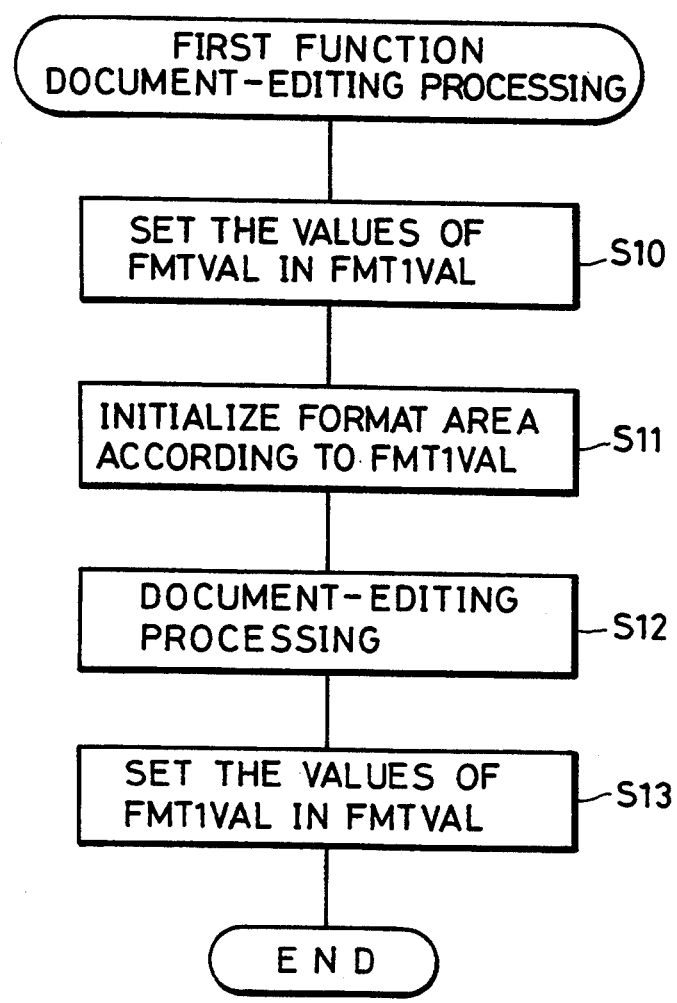
Figure 5:
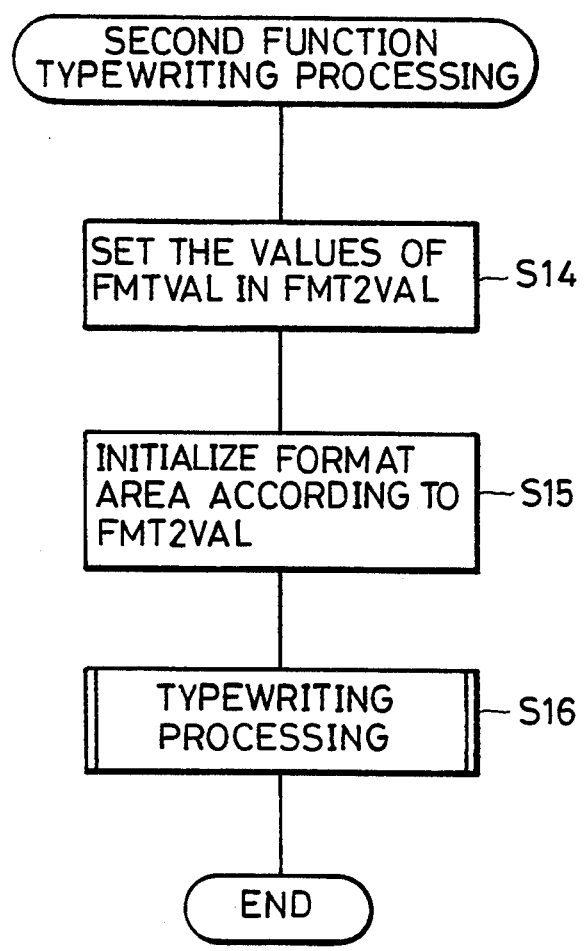

FIG. 5 (A) shows the initial processing in the present embodiment. When power from the power supply is applied, the entire system is initialized at step S1 by CPU 6. At step S2, the values of the information in the IFMTVAL are stored in the FMTVAL, i.e., the initial format information held in the IFMTVAL of the system ROM 3 is stored in the initial-information common save area FMTVAL in the system RAM 10 via commands from CPU 6. Then, at step S3, the document editing processing as the first function shown in FIG. 5 (C) is activated by CPU 6 in response to the depressing of the document processing selection key.

FIG. 5 (B) shows processing steps corresponding to key inputs in the present embodiment. First, at step S4, whether a key input is performed or not is determined by CPU 6. When a key input is performed, the processing proceeds to step S5, and CPU 6 determines whether the document processing selection key for selecting the document-editing processing is pressed. When document-editing processing is selected here, the document-editing processing shown in FIG. 5 (C) is activated at step S6 by CPU 6, and the key input processing is terminated. When CPU 6 determines that the document processing selection key is not pressed, CPU 6 determines whether the typewriting processing selection key is pressed at step S7. When typewriting processing is selected, the typewriting processing shown in FIG. 5 (D) is activated at step S8 by CPU 6. If CPU 6 determines that the typewriting processing selection key is not pressed, processing corresponding to other key inputs is performed at step S9 under CPU 6 control, and then when those processings are completed, all the processings are terminated. It will be noted that the selection of the document-editing processing or the typewriting processing is performed, for example, by selecting a menu display in the display picture shown on CRT 7 by pressing a key on keyboard 1.

The selection on the display is performed by moving a cursor on the picture using the LEAP key in FIG. 2. This selection may also be performed, for example, by the SHIFT key+2 in FIG. 2.

FIG. 5 (C) shows the document-editing processing as the first function in the present embodiment. At step S10, the values or information in the FMTVAL is loaded or set in the first-function-information save area FMT1VAL under control by CPU 6. Then, at step S11, the format information is initialized according to the information stored in the FMT1VAL. At step S12, normal document-editing processing is performed under control of CPU 6. At step S13, the values or the format information modified during the document-editing operation at step S12 or the values or format information as it is when there is no modification, i.e., the values or information in the FMT1VAL is set in the FMTVAL under control of CPU 6 to update the values in the FMTVAL, and thus the document-editing processing is terminated.

FIG. 5 (D) shows the typewriting processing as the second function in the present embodiment. That is, at step S14, the values or information of the FMTVAL are set in the second-function-information save area FMT2VAL under control of CPU 6. Next, at step S15, the format information is initialized according to the information of the FMT2VAL. At step S16, normal typewriting processing is performed, and when the end of this typewriting processing is designated by a key operation of the keyboard, the processing is terminated. Here, information in the FMT2VAL regardless of whether it has been modified during the typewriting operation at step S16 does not update the information in the FMTVAL.

As is apparent from the steps shown in FIGS. 5 (A) through 5 (D), in the present embodiment, when power from the power supply is applied, the document-editing processing as the first function is activated after a predetermined initial processing. Subsequently, the document-editing processing or the typewriting processing can be activated in accordance with the key operation for such a selection.

In the above-described embodiment, an explanation has been provided of an embodiment in which the main function (the first function) is document-editing processing, and the subfunction (the second function) is typewriting processing. However, it is within the scope of the present invention for both processings to be main functions in a first alternative embodiment. In this case, format or other information modified during each processing function is set in the FMTVAL to be used by other processing functions. Furthermore, it is also within the scope of the present invention for both processings to be subfunctions in a second alternative embodiment. In this case format or other information modified during each processing operation is not set in the FMTVAL, and it is possible to perform information control which is independent for different processing operations.

In these alternative embodiments, the device shown in FIGS. 1 and 3 can be used. Further, the steps performed under the control of CPU 6 in these embodiments are the same as those shown in FIGS. 5 (A)–5 (D), except in the first alternative embodiment during typewriting processing the values of FMT2VAL are set in the FMTVAL, and in the second alternative embodiment step S13 is eliminated from FIG. 5 (C).

As explained above, according to the present invention, for example, each processing operation or function is set to be either a main function or subfunction, and the information used to perform each function is controlled according to this setting. Hence, it is possible to obtain the common information desired by the operator for performing each function, as well as to obtain the information for performing each function which is independent from information used to perform other functions.

As a result, in the present invention the information desired by the operator can be obtained by an easy operation of the operator, and thus it is possible to improve the operability of the device and to have more precise information control over each function.

The invention components shown in FIGS. 1 and 3 are all well known in the character processing art and their specific construction and operation is not critical to the operation or best mode for carrying out the invention. Moreover, the steps illustrated in FIGS. 5 (A)–5 (D) can be easily programmed into well known central processing units by persons of ordinary skill and since such programming per se is not part of this invention no further description thereof is deemed necessary.

What is claimed is:

1. A character processing device adapted to perform document-editing processing and typewriting processing of information comprising:

switching means for switching said device between performing document-editing processing and typewriting processing;

first storing means for storing common format information used for conducting document-editing processing and typewriting processing;

second storing means for storing format information for use in conducting document-editing processing;

third storing means for storing format information for use in conducting typewriting processing;

first control means for causing the common format information in said first storing means to be loaded into said second storing means and for causing the device to perform document-editing processing using the information in said second storing means when said switching means switches said device to perform document-editing processing, modifying means fox modifying the format information in said second storing means during document-editing processing and for modifying the format information in said third storing means during typewriting processing;

second control means for causing the format information in said second storing means modified by said modifying means to be copied into said first storing means as a new common format information in response to said switching means switching said device from document-editing processing to typewriting processing and maintaining without change the common format information before and after typewriting processing; and third control means for causing the common format information in said first storing means to be loaded into said third storing means and for causing said device to perform typewriting processing using the information in said third storing means, in response to said switching means switching device from document-editing processing to typewriting processing, after said second control means causes the modified format information in said second storing means to be copied into said first storing means as the new common format information, thereby conducting typewriting processing using the format information modified during document-editing processing.

2. The device defined by claim 1 further comprising fourth storing means for storing a fixed program, wherein said control means operates in accordance with the fixed program.

3. The device defined by claim 1 further comprising input means for inputting information into said device, wherein said control means operates in accordance with the input information.

4. A character processing device adapted to perform document-editing processing and typewriting processing of information comprising:

switching means for switching said device between performing document-editing processing and typewriting processing;

first storing means for storing common format information used for conducting document-editing processing and typewriting processing;

second storing means for storing format information for use in conducting document-editing processing;

third storing means for storing format information for use in conducting typewriting processing;

first control means for causing the format information stored in said first storing means to be loaded into said second storing means when said switching means switches said device from typewriting processing to a document-editing processing, and for causing the format information stored in said first storing means to be loaded into said third storing means when said switching means switches said device from document-editing processing to typewriting processing; and second control means for causing the format information stored in said second storing means to be copied into said first storing means when said switching means switches said device from document-editing processing to typewriting processing before the format information in said first storing means is loaded into said third storing means, and for causing the format information in said third storing means to have no influence upon said first storing means, wherein maid switching means and first storing means are connected to said first and second control means.

5. The device defined by claim 4 further comprising modifying means for modifying the information in said second storing means during document-editing processing, and wherein said control means causes the modified information in said second storing means to be copied into said first storing means when said switching means switches said device from document-editing processing to typewriting processing.

6. The device defined by claim 4 wherein the common information stored in said first storing means is format information.

7. A method of processing characters in a character processing device, comprising:

a first step of switching the character processing device to perform document-editing processing and loading common format information, used for conducting document-editing processing and typewriting processing, from first storing means into second storing means for storing format information used in conducting document-editing processing;

a second step of performing document-editing processing with the character processing device using the information in the second storing means after said a third step of switching the character processing device to perform typewriting processing and loading common format information, used for conducting document-editing processing and typewriting processing, from first storing means into third storing means for storing format information used in conducting typewriting processing;

a fourth step of performing typewriting processing with the character processing device using the information in the third storing means after said third step;

a fifth step of modifying the format information in the second storing means during document-editing processing in said second step; and a sixth step of copying the modified format information in the second storing means into the first storing means for use in conducting typewriting processing in response to the switching of the character processing apparatus from document-editing processing to typewriting processing before loading common format information from the first storing means into the third storing means in said third step, wherein said first and second steps are performed before or after said third and fourth steps.

8. The method defined by claim 7, further comprising the step of performing said first, second, third, fourth, and fifth steps according to a fixed program stored in fourth storing means.

9. The method defined by claim 7 further comprising the steps of inputting information into the character processing device and performing the first, second, third, fourth, and fifth steps in accordance with the input information.

10. A method of processing characters in a character processing device, comprising:
- a first step of switching the character processing device from performing document-editing processing to typewriting processing;
- a second step of copying information for use in conducting document-editing processing from second storing means for storing information for use in conducting document-editing processing to first storing means for storing common information used for conducting document-editing processing and typewriting processing in response to said first step;
- a third step of loading the common information stored in the first storing means into third storing means for storing information for use in conducting typewriting processing in response to said first step after said second step;
- a fourth step of switching the character processing device from performing typewriting processing to document-editing processing;
- a fifth step of abstaining from copying information in the third storing means into the first storing means in response to said fourth step; and
- a sixth step of loading the common information stored in the first storing means into the second storing means in response to said fourth step after said fifth step,
- wherein said first, second and third steps are performed before or after said fourth, fifth and sixth steps.

11. The method defined by claim 10, further comprising the step of modifying the information in the second storing means during document-editing processing, wherein said second step comprises the step of copying the modified information stored in the second storing means into the first storing means in response to said first step.

12. The method defined by claim 10, wherein the common information stored in the first storing means is format information.

13. A character processing device adapted to process character information in a first and a second processing mode comprising:
- switching means for switching said device between the first and the second processing modes;
- first storing means for storing common information used for processing character information in the first and second processing modes;
- second storing means for storing information for use in the first processing mode;
- third storing means for storing information for use in the second processing mode;
- first control means for causing the information in said second storing means to be copied into said first storing means and for causing the copied information in said first storing means to be loaded into said third storing means when said switching means switches said device from the first processing mode to the second processing mode; and
- second control means for causing the information in said third storing means to have no influence upon said first storing means, and for causing the information in said first storing means to be loaded into said second storing means when said switching means switches said device from the second processing mode to the first processing mode.

14. A method of processing characters in a character processing device, comprising;
- a first step of switching the character processing device from performing processing in a first processing mode to a second processing mode;
- a second step of copying information for use in the first processing mode from second storing means for storing information for use in the first processing mode to first storing means for storing common information used in the first and the second processing modes in response to said first step;
- a third step of loading the common information stored in the first storing means into third storing means for storing information for use in the second processing mode in response to said first step after said second step;
- a fourth step of switching the character processing device from performing processing in the second processing mode to the first processing mode;
- a fifth step of maintaining without change the common information in the first storing means before and after said fourth step; and
- a sixth step of loading the common information stored in the first storing means into the second storing means in response to said fourth step,
- wherein said first, second and third steps are performed before or after said fourth, fifth and sixth steps.

* * * * *

UNITED STATES PATENT AND TRADEMARK OFFICE
CERTIFICATE OF CORRECTION

PATENT NO. : 5,377,358     Page 1 of 2
DATED      : December 27, 1994
INVENTOR(S) : KAZUHIRO NAKAMURA It is certified that error appears in the above-indentified patent and that said Letters Patent is hereby corrected as shown below:

IN SHEET 2 OF THE DRAWINGS

Fig 2.

"SEND CONTOROL" should read
--SEND CONTROL--.

COLUMN 1

Line 6, "continuation-in-part" should read
--continuation--.
Line 66, "area" should read --areas--.
Line 67, "controller," should read --a controller.--.

COLUMN 2

Line 18, "area" should read --areas--.
Line 39, "switch," should read --a switch,--.
Line 40, "area" should read --areas--; and "controller"
should read --a controller--.

COLUMN 4

Line 6, "area 10a)." should read --area) 10a.--; and
"workarea" should read --work area--.
Line 8, "area 10b)" should read --area) 10b--.
Line 11, "area" should read --area)--.
Line 12, "10c)" should read --10c--.

UNITED STATES PATENT AND TRADEMARK OFFICE
CERTIFICATE OF CORRECTION

PATENT NO. : 5,377,358        Page 2 of 2

DATED : December 27, 1994

INVENTOR(S) : KAZUHIRO NAKAMURA

It is certified that error appears in the above-indentified patent and that said Letters Patent is hereby corrected as shown below:

COLUMN 7

Line 18, "fox" should read --for--.

COLUMN 8

Line 18, "maid" should read --said--.
Line 24, "control means" should read --second control means--.
Line 45, "said" should read --said first step;--.

Signed and Sealed this

Thirteenth Day of June, 1995

Attest:

BRUCE LEHMAN

*Attesting Officer*      *Commissioner of Patents and Trademarks*